March 29, 1966      B. H. THUE      3,243,803
RADAR ALTIMETER TRACKING APPARATUS
Filed March 23, 1964
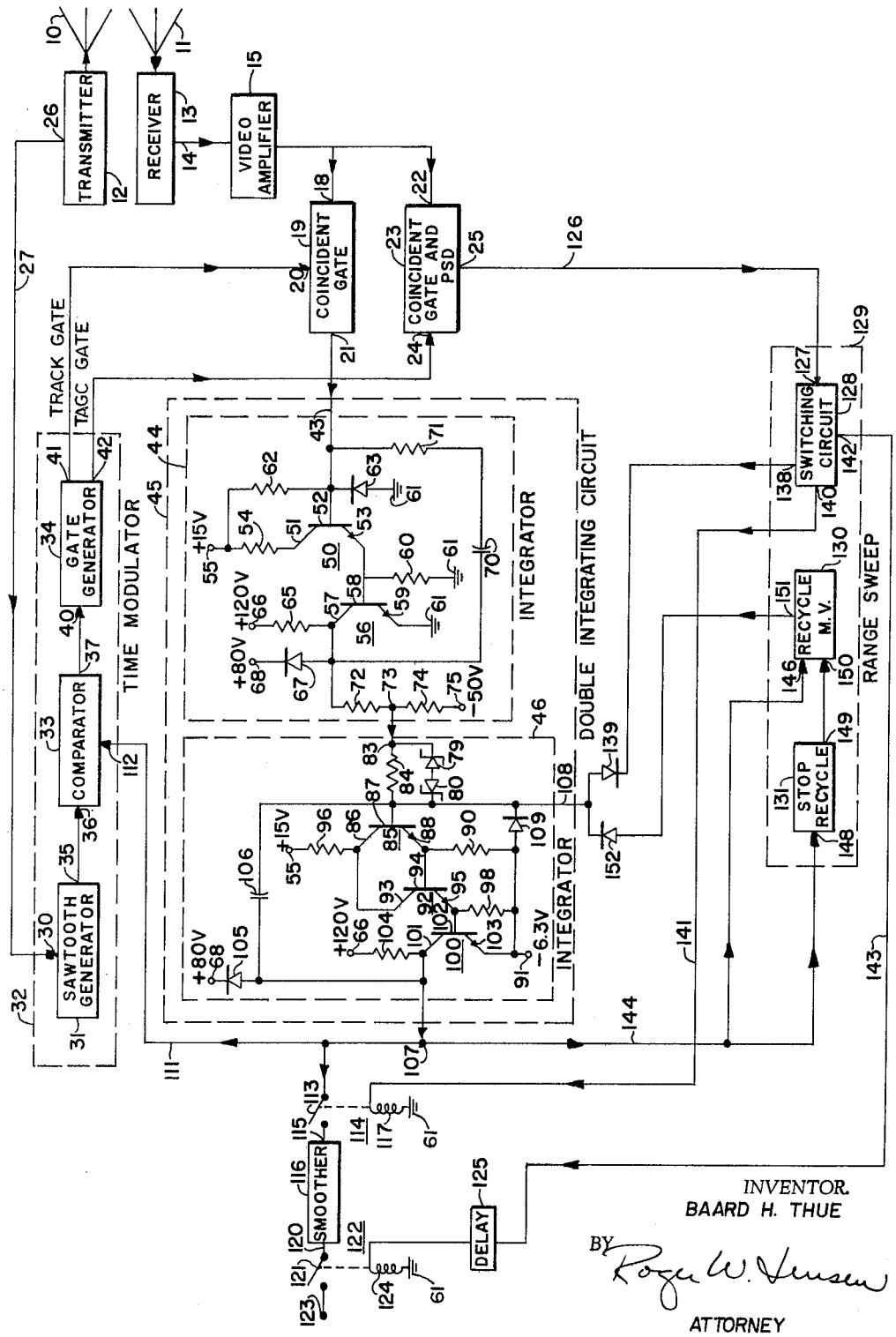
INVENTOR.
BAARD H. THUE
BY Roger W. Hinsen
ATTORNEY

United States Patent Office 3,243,803
Patented Mar. 29, 1966

3,243,803
RADAR ALTIMETER TRACKING APPARATUS
Baard H. Thue, Minneapolis, Minn., assignor to Honeywell Inc., a corporation of Delaware
Filed Mar. 23, 1964, Ser. No. 353,763
6 Claims. (Cl. 343—7.3)

This invention pertains to pulse radar systems utilizing automatic target tracking and more particularly to improvements in the acquisition bandwidth and the initial track rate capability of automatic tracking radar altimeter systems.

With the advent of supersonic aircraft it has become imperative that pulse radar altimeter systems have a broad acquisition bandwidth and a high initial track rate capability since the increased climbing rate of the aircraft as well as any rapidly changing characteristics of the earth's surface below the craft produce sudden changes in the target or altitude rate. The initial track rate capability is defined as the track rate capability the instant a sudden relatively large change in the target rate is introduced into the radar tracking loop. At the same time it is desirable that the radar tracking loop have a relatively low acquisition bandwidth in order to minimize undesired noise effects. However, the low tracking loop bandwidth results in the tracking loop having a relatively low initial track rate capability.

The present invention provides a radar altimeter system which operates with a relatively low acquisition bandwidth during normal tracking conditions but which automatically broadens its acquisition bandwidth in the event of a sudden change in target rate as a result of a sudden change in aircraft altitude or terrain characteristics.

The invention comprises an automatic tracking loop which includes a sawtooth generator which is energized by a timing pulse generated in synchronism with a transmitted output pulse. The sawtooth generator produces a sawtooth, or ramp, output having a time duration which is a function of range or altitude. The sawtooth signal is applied to a comparator where it is compared with the output of a double integrator.

The double integrator comprises a first, or altitude rate, integrator which has its output connected to the input of a second, or altitude, integrator. The output of the altitude integrator is connected to the comparator.

When the output of the double integrator and the instantaneous value of the sawtooth signal are equal a pulse is generated at the output of the comparator which is applied to the input of a gate generator. The gate generator produces two output gates in response to the pulse output of the comparator. The first output gate of the gate generator is called the track gate and the second output gate is called the track automatic gain control gate (TAGC). The track gate enables a coincident gate circuit while the TAGC gate enables a coincident gate and peak sensing detector circuit.

When a reflected transmitted pulse, which in the case of a radar altimeter has reflected from the ground below the aircraft, is received by the receiver antenna it is applied to a receiver which produces a video pulse output. This video pulse is amplified and applied to inputs of the coincident gate circuit and the coincident gate and peak sensing detector circuit. The output of the coincident gate circuit is applied to the input of the altitude rate integrator in the double integrating circuit. The output of the coincident gate circuit is a current which is proportional to the area of coincidence between the video pulse and the track gate.

If the aircraft's altitude changes suddenly, either because the aircraft is climbing or diving or because of a sudden terrain change such as a canyon or a mountain, the altitude video pulse occurs either earlier or later in time, depending upon whether the altitude has decreased or increased. In either case the track gate must move suddenly in time so as to remain coincident with the video pulse. The rate at which the track gate can move in time is called the track rate capability (TRC) and is equal to $$E_1\left(\frac{K}{T_2}\right)$$

where $E_1$ is the output voltage of the altitude rate integrator, $K$ is the slope of the sawtooth signal and $T_2$ is the time constant of the altitude integrator. If $K$, the slope of the sawtooth signal, is a constant and $E_1$, the output voltage of the altitude rate integrator, is a factor which follows the input with some inherent lagging characteristics it can be seen from the above relationship that the instantaneous track rate capability is basically dependent upon the time constant $T_2$ of the altitude integrator and approaches a maximum when the time constant is a minimum. At the initial loss of coincidence between the track gate and the video pulse the output of the altitude rate integrator does not immediately reach its maximum output, rather there is a time delay caused by the fact that a feedback capacitor must charge. Therefore, the initial track rate capability is determined by the initial time constant of the altitude integrator.

In the present invention a substantially constant voltage source, such as a pair of zenor diodes connected back to back, is connected in parallel with the input impedance of the altitude integrator. The operation of the constant voltage source is such that when the voltage drop across the input impedance, due to an input signal, reaches a predetermined value the remainder of the input signal is effectively shorted around the input impedance and applied directly to the input of the altitude integrator. Since the time constant of the altitude integrator is actually a measure of the length of time required to fully charge a feedback capacitor connected from the output to the input of the altitude integrator and since this charge time is determined by the amount of current flowing into the input of the altitude integrator, when the input impedance is decreased the input current increases, thus, decreasing the charge time or the overall time constant of the circuit.

If the aircraft's altitude changes suddenly the amount of coincidence between the track gate and the video return pulse changes and a large variation in the input signal to the altitude rate integrator occurs. This large change in the input signal causes a large change in the output signal of the altitude rate integrator. This large output signal is applied to the input of the altitude integrator and when it reaches the predetermined value the constant voltage source causes the input impedance to look substantially like a short circuit for any amplitude higher than the predetermined value. Thus, the time constant $T_2$ of the altitude integrator is decreased and the instantaneous or initial track rate capability, as well as the acquision bandwidth, is increased. As the acquisition bandwidth increases the response time of the track gate decreases so that the proper amount of coincidence, between the track gate and the video return signal is rapidly again obtained. When the proper amount of coincidence is again obtained the input to the altitude integrator is again below the predetermined value and the time constant as well as the acquision bandwidth is again normal. In this manner the present invention obtains both the benefit of a high initial track rate capability and also a relatively low tracking loop acquision bandwidth during normal tracking operation.

It is one object of this invention to provide an improved pulse radar system utilizing automatic target tracking.

Another object of this invention is to provide an automatic tracking radar altimeter system having an improved acquisition bandwidth and initial track rate capability.

These and other objects of my invention will become apparent to those skilled in the art upon consideration of the accompanying specification, claims, and drawing of which:

The single figure shows a schematic representation of the present invention.

Structure

Referring to the figure there is shown a transmitter antenna 10 and a receiver antenna 11. Transmitter antenna 10 is connected to the output of a transmitter 12, while receiver antenna 11 is connected to the input of a receiver 13. A video output 14 of receiver 13 is connected through a video amplifier 15 to an input 18 of a coincident gate circuit 19 and to an input 22 of a coincident gate and peak sensing detector circuit 23. Coincident gate circuit 19 further has an enabling input 20 and an output 21. Coincident gate and peak sensing detector circuit 23 further has an enabling input 24 and an output 25.

A timing output 26 of transmitter 12 is connected by means of a conductor 27 to an input 30 of a sawtooth generator 31 of a time modulator 32. Time modulator 32 further includes a comparator 33 and a gate generator 34. An output 35 of sawtooth generator 31 is connected to a first input 36 of comparator 33, and an output 37 of comparator 33 is connected to an input 40 of gate generator 34.

A first output 41 of gate generator 34 is connected to the enabling input 20 of coincident gate circuit 19, and a second output 42 of gate generator 34 is connected to the enabling input 24 of coincident gate and peak sensing detector circuit 23. The output 21 of coincident gate circuit 19 is connected to an input 43 of a first integrator 44 of double integrator 45. Double integrator 45 further includes a second integrator 46.

Input 43 of integrator 44 is connected directly to a base 52 of a transistor 50. Transistor 50 further has a collector 51 and an emitter 53. Collector 51 of transistor 50 is connected by means of a resistor 54 to a positive 15 volt potential source 55. Emitter 53 of transistor 50 is connected directly to a base 58 of a transistor 56 and indirectly by means of a resistor 60, to ground 61. The base 52 of transistor 50 is connected by means of a resistor 62 to the potential source 55 and by means of a reverse poled diode 63 to ground 61.

Transistor 56 has a collector 57 which is connected by means of a resistor 65 to a positive 120 volt potential source 66, and by means of a diode 67 to a positive 80 volt potential source 68. Transistor 56 also has an emitter 59 which is connected directly to ground 61. Collector 57 of transistor 56 is further connected by means of a resistor 72 to an output terminal 73 of integrator 44. Output terminal 73 is connected by means of a resistor 74 to a negative 50 volt potential source 75.

Output 73 of integrator 44 is connected to an input 83 of integrator 46. Input 83 of integrator 46 is connected by means of a resistor 84 to a base 87 of a transistor 85. A first zener diode 79 and a second zener diode 80 connected in series but in opposite phase relationship are connected in parallel with resistor 84.

Transistor 85 further has a collector 86 and an emitter 88. Emitter 88 of transistor 85 is connected by means of a resistor 90 to a negative 6.3 volt potential source 91, and is further directly connected to a base 94 of a transistor 92. Transistor 92 further has a collector 93 and an emitter 95. Collector 86 of transistor 85 is directly connected to collector 93 of transistor 92, and is further connected by means of a resistor 96 to the positive 15 volt potential source 55.

Emitter 95 of transistor 92 is connected by means of a resistor 98 to the negative 6.3 potential source 91 and is further connected to a base 102 of a transistor 100. Transistor 100 further has a collector 101 and an emitter 103. Emitter 103 of transistor 100 is connected directly to the negative 6.3 potential source 91. Collector 101 of transistor 100 is connected by means of a resistor 104 to the positive 120 volt potential source 66, and by means of a diode 105 to the positive 80 volt potential source 68. Collector 101 further is connected by means of a capacitor 106 to the base 87 of transistor 85, and is further connected to an output terminal 107 of integrator 46. The base 87 of transistor 85 is directly connected to an input terminal 108 of integrator 46 and the negative 6.3 potential source 91 is connected by means of a diode 109 to input terminal 108.

Output 107 of integrator 46 is connected by means of a conductor 111 to a second input 112 of comparator 33. The loop just explained consisting of a sawtooth generator 31, comparator 33, gate generator 34, coincident gate circuit 19, first integrator 44 and second integrator 46 is known as the tracking loop and is the tracking circuitry for the present apparatus. Output 107 of integrator 46 is further connected by means of a contact 113 of a relay 114 to an input 115 of a smoother circuit 116. Relay 114 further has a relay winding 117. An output 120 of smoother circuit 116 is connected by means of a relay contact 121 of a relay 122 to an altitude output terminal 123. Relay 122 further has a relay winding 124.

Output 25 of coincident gate and peak sensing detector circuit 23 is coupled by means of a conductor 126 to an input 127 of a switching circuit 128 which is part of a range sweep unit 129. Range sweep unit 129 further includes a recycle multivibrator 130 and a stop recycle circuit 131. An output 138 of switching circuit 128 is connected by means of a reverse poled diode 139 to the input 108 of integrator 46. An output 140 of switching circuit 128 is connected by means of a conductor 141 to one side of the relay winding 117 of relay 114 while the other side is connected to ground 61. An output 142 of switching circuit 128 is connected by means of a conductor 143 to a delay circuit 125. The output of delay circuit 125 is connected to one side of the relay winding 124 of relay 122 and the other side is connected to ground 61.

Output 107 of integrator 46 is connected by means of a conductor 144 to an input 146 of recycle multivibrator 130, and by means of conductor 144 to an input 148 of stop recycle circuit 131. An output 149 of stop recycle circuit 131 is connected to an input 150 of recycle multivibrator 130. An output 151 of recycle multivibrator 130 is connected by means of a diode 152 to the input 108 of integrator 46.

Operation

Transmitter 12 generates short pulse width pulses of RF energy which are applied to transmitting antenna 10 and are radiated toward the target, in this case ground. The reflected RF energy pulse is picked up by the receiver antenna 11 and is applied to receiver 13. Receiver 13 produces a video output signal at output 14 which is coupled through the video amplifier 15 to the inputs 18 and 22 of coincident gate circuit 19 and coincident gate and peak sensing detector circuit 23 respectively. Each time the transmitter produces a pulse a timing pulse appears at transmitter output terminal 26 and is coupled through conductor 27 to the input 30 of sawtooth generator 31. This timing pulse initiates the generation of a sawtooth signal which appears at the output 35 of sawtooth generator 31 and is coupled to the input 36 of comparator 33. The output appearing at terminal 107 of the double integrator 45 is coupled through conductor 111 to the input 112 of comparator 33. When the instantaneous magnitude of the sawtooth applied to comparator 33 is equal to the magnitude of the output of the double integrator 45 a signal appears at output terminal 37 of comparator 33 and is coupled to the input 40 of gate generator 34.

This input to gate generator 34 causes a first and a second gate to appear at the gate generator output terminals 41 and 42, respectively. The first gate output called the track gate, is coupled from output terminal 41 of gate generator 34 to the input terminal 20 of coincident gate circuit 19 while the second gate output, called the track automatic gain control (TAGC) gate appears at output terminal 42 of gate generator 34 and is coupled to the input terminal 24 of coincident gate and peak sensing detector circuit 23. The trailing edge of the TAGC gate appearing at output terminal 42 of gate generator 34 is delayed in time by a predetermined amount with respect to the trailing edge of the track gate appearing at output terminal 41 of gate generator 34. The track gate input to terminal 20 of coincident gate circuit 19 enables the circuit 19 during the leading edge of the video pulse coupled to input 18 of circuit 19, and thereby allows an output signal proportional to the leading edge of the video signal to appear at output terminal 21 of circuit 19. The output signal from the coincident gate circuit 19 is coupled to the input 43 of integrator 44. This signal is integrated in integrator 44 and is coupled from the output 73 of integrator 44 to the input 83 of integrator 46. The signal at the output 73 of integrator 44 is proportional to the rate of change of altitude. As mentioned previously, this signal is coupled to the input 83 of integrator 46 where it is integrated. Since the input to integrator 46 is proportional to the rate of change of altitude the output appearing at output 107 of integrator 46 is proportional to altitude. This signal is coupled through relay contact 113 to the input 115 of smoother circuit 116.

The signal is then smoothed in the smoother circuit 116 and appears as a D.C. level at the output 120 of smoother 116. The smoothed altitude signal is coupled through relay contact 121 to the altitude output terminal 123.

As mentioned previously, the altitude signal appearing at output terminal 107 of integrator 46 is also coupled through conductor 111 to input terminal 112 of comparator 33. The magnitude of the altitude signal determines at which point in time an output signal appears at the output of comparator 33 and, hence, the time at which gate generator 34 generates the track gate and TAGC gate.

The TAGC gate transmitted to the input 24 of the coincident gate and peak sensing detector circuit 23, from the output 42 of gate generator 34, enables circuit 23. When the coincident gate and peak sensing detector circuit 23 is enabled the video signal appearing at its input 22 is transmitted through the circuit and an output appears at output terminal 25 which is proportional to the peak amplitude of the video signal.

The output signal at terminal 25 of the coincident gate and peak sensing detector circuit 23 is coupled by means of conductor 126 to the input 127 of switching circuit 128 thereby operating switching circuit 128 to its first state. When switching circuit 128 is in its first state an output appears at output terminal 140 and is coupled through conductor 141 to relay winding 117 of relay 114 energizing the winding and thereby closing relay contact 113. An output signal also appears at output 142 of switching circuit 128 and is coupled through conductor 143 and delay circuit 125 to winding 124 of relay 122 thereby energizing relay 122. When relay 122 is energized relay contact 121 is closed. As explained previously, when relay contact 113 is closed the altitude output of the double integrator 45 is connected to the input of smoother circuit 116 and when relay contact 121 is closed the output of smoother circuit 116, or in other words the altitude signal, is connected to the altitude output terminal 123.

Assume now that the track gate and the TAGC gate from the output of gate generator 34 lose track of the video pulse. In other words, assume that the track gate appearing at input 20 of coincident gate circuit 19 is not coincident with the video pulse applied to input 18 of coincident gate circuit 19, and similarly, the TAGC gate applied at input 24 of the coincident gate and peak sensing detector circuit 23 is not coincident with the video pulse applied to input 22 of circuit 23. In this situation there is no output from either coincident gate circuit 19 or coincident gate and peak sensing detector circuit 23 and, hence, it becomes necessary for the altimeter to switch over to a search mode so as to re-establish coincidence between the tracking gates and the video pulse.

The searching operation is accomplished as follows: when coincidence between the TAGC gate and the video pulse is lost, or when the output from the coincident gate and peak sensing detector circuit 23 drops below a predetermined value, the input to switching circuit 128 is insufficient to maintain switching circuit 128 in its first operating state and hence it switches to its second operating state.

When switching circuit 128 is in its second mode of operation a substantially step function signal appears at output terminal 138 of switching circuit 128 and is coupled through diode 139 to the input 108 of the second integrator 46. This substantially step function input signal to integrator 46 is integrated and sweeps the output signal of integrator 46 to its positive limit. The output 107 of integrator 46 is coupled through conductor 144 to the input 146 of recycle multivibrator 130. When the output signal of integrator 46 reaches its positive limit, recycle multivibrator 130 changes state and a substantially step function output signal appears at recycle multivibrator output 151. This signal is coupled through diode 152 to the input 108 of integrator 46. This substantially step function signal is of an opposite polarity to the step function output signal of switching circuit 128 and, hence, this signal is integrated in integrator 46 and sweeps the output signal of integrator 46 to its negative limit. The output 107 of integrator 46 is connected by means of conductor 144 to the input 148 of the stop recycle circuit 131. As the output signal of integrator 46 reaches its negative limit a signal appears at output 149 of stop recycle circuit 131 and is coupled to input 150 of recycle multivibrator 130 thereby resetting recycle multivibrator 130. When recycle multivibrator 130 is reset the step function output signal disappears from recycle multivibrator output 151 and the step function output signal from switching circuit 128 again controls the operation of integrator 46 and tends to sweep the output signal of the integrator to its positive limit once more.

As the output signal of double integrator 45 sweeps over its range from the positive limit to the negative limit, the point at which the instantaneous magnitude of the sawtooth wave form applied to input 36 of comparator 33 equals the magnitude of the output signal of double integrator 45 applied to input 112 of comparator 33 varies, and hence the time at which the output signal appears on output terminal 37 of comparator 33 also varies. Since the output signal of comparator 33 controls the time at which the gate generator 34 generates the track gate and the TAGC gate the times of these gates also vary and these gates are effectively swept continuously up and back through substantially the limit of the altimeter range. At some point during the searching operation the track gate and the TAGC gate intercept the video pulse from the output of video amplifier 15. At this time the track gate applied to terminal 20 of coincident gate circuit 19 is coincident with the video pulse supplied to input 18 of coincident gate circuit 19 and, hence, an output signal appears at output terminal 21. Similarly, the TAGC gate applied to terminal 24 of the coincident gate and peak sensing detector circuit 23 is coincident with the video pulse supplied to input terminal 22 and, hence, an output signal once again appears at output terminal 25. As explained previously, the output signal on terminal 25 of coincident gate and peak sensing detector circuit 23 switches switching circuit 128 to its first mode of operation and the altimeter returns to the track mode.

When the altimeter changes from its track mode of operation to its search mode of operation, and switching circuit 128 changes from its first mode to its second mode of operation, the output signal at output terminal 140 of switching circuit 128, which energized relay winding 117 of relay 114, is not immediately removed but rather there is a short time delay before relay winding 117 is de-energized. The purpose of this short time delay is to prevent the smoother 116 from being disconnected from the output 107 of the double integrator 45 in the event that there is a momentary loss of coincidence between the track gate and the TAGC gate and the video signal. Similarly, when switching circuit 128 changes from its first mode of operation to its second mode of operation and the output signal at output terminal 142 of switching circuit 128 disappears, delay circuit 125 prevents the immediate de-energization of relay winding 124 of relay 122. The delay of delay circuit 125 which inhibits the de-energization of relay winding 124 is substantially longer than the delay in switching circuit 128 which inhibits the de-energization of relay winding 117.

Smoother circuit 116 contains a memory, and hence this circuit remembers the aircraft's altitude at the moment that relay winding 117 is de-energized and relay contact 113 is opened thereby disconnecting smoother circuit 116 from the output of the double range integrator 45. If the searching circuits are unable to re-establish coincidence between the video signal and the track gate and TAGC gate during the delay time of delay circuit 125 then relay winding 124 is de-energized and relay contact 121 opens, thereby removing the altitude signal from the altitude output terminal 123. As soon as coincidence is re-established between the video signal and the track gate and the TAGC gate, relay windings 117 and 124 are again energized and the altitude indicator indicates the present altitude.

When the altimeter is in its track mode of operation the track gate and the TAGC gate, produced by the gate generator 34 and applied to the coincident gate circuit 19 and the coincident gate and peak sensing detector circuit 23, respectively, must track, or follow, the video pulse produced by the video amplifier 15. If a sudden change in the time of return of the video pulse should occur, due to a sudden change in the altitude, there must be a rapid change in the time of generation of the track gate and the TAGC gate to retain coincidence between these gates and the video pulse in the coincident gate circuit 19 and the coincident gate and peak sensing detector circuit 23. If the time of generation of the track gate and TAGC gate cannot be changed rapidly enough to maintain coincidence between these gates and the video pulse the coincident gate circuit 19 and the coincident gate and peak sensing detector circuit 23 lose coincidence and the switching circuit 128 switches to the search mode because of a lack of signal at the input 127. The time required for the track loop to generate the track gate and the TAGC gate is directly dependent upon the acquisition bandwidth of the tracking loop. The acquisition bandwidth of the tracking loop is maintained relatively narrow during normal operation to reduce the effect of noise in the system. Because the acquisition bandwidth of the tracking loop is normally narrow the tracking loop does not have the ability to change its tracking rate suddenly. That is when the rate of the video pulse suddenly changes the initial coincidence between the track and the TAGC gate and the video pulse may be lost. Thus, so that the system is not continually switching from the track mode to the search mode the present invention increases the initial track rate capability.

The track rate capability is equal to $$E_1\left(\frac{K}{T_2}\right)$$

Where $E_1$ is the output signal of the altitude rate integrator 44 at the output 73, K is the slope of the sawtooth signal produced at the output 35 of the sawtooth generator 31 and $T_2$ is the time constant of the altitude integrator 46. K is held constant in the present circuitry and $E_1$ is allowed to vary in a normal fashion while $T_2$ is decreased when the current flowing from output 73 into input 83 reaches a predetermined value.

To illustrate the manner in which the present circuitry causes the time constant $T_2$ of the altitude integrator 46 to decrease when the rate of the video pulse is suddenly changed three different relationships between the video pulse and the track gate will be utilized. Assume that the time of return of the video pulse is not changing, or is changing at a relatively slow rate and the track gate is coincident with the leading edge of the video return pulse in the coincident gate circuit 19. A current, which is representative of the area of the track gate coincident with the video return pulse, is applied to the input 43 of the altitude rate integrator 44. This current flowing into the terminal 43 is a negative current and, when the proper amount of coincidence between the track gate and the video return pulse is maintained, this current exactly nullifies a current which flows from the positive 15 volt source 55 through the resistor 62. Thus, the input current to the altitude rate integrator 44 is zero or substantially zero and the output is zero or substantially zero. This signal applied to the input 83 of integrator 46 will be well below the value of signal necessary to break down either of the zener diodes 79 or 80 and, thus, integrator 46 will operate normally.

Now assume that the return time of the video pulse suddenly increases. The amount of coincidence between the track gate and the video pulse in the coincident gate circuit 19 decreases and the current flowing into the input 43 of the altitude rate integrator 44 is smaller. Assuming for simplicity that the change in video pulse return time is so sudden that the input to the altitude rate integrator 44 is substantially a negative going step function, the integrated output is a negative going sawtooth shaped signal. This sawtooth signal is applied to the input 83 of the altitude integrator 46 and is apparent across the input resistor 84. When the voltage across the input resistor 84 becomes sufficiently negative the zener diode 80 breaks down and conducts current in a reverse direction from the output 73 of the altitude rate integrator 44 to the base 87 of the transistor 85. The diode 79 conducts the current in the forward direction in this case. Thus, once the voltage across the input resistor 84 and the zener diodes 79 and 80 becomes high enough to break down the diode 80, and the input signal continues to increase, the current flowing into the base 87 of the transistor 85 increases at a faster rate and the feedback capacitor 106 must conduct more current to offset this larger input current. Since the feedback capacitor conducts more current it becomes fully charged more quickly and, therefore, the time constant, $T_2$, of the altitude integrator 46 is decreased.

Thus, as previously explained, since the time constant $T_2$ is decreased the track rate capability of the tracking loop and the acquisition bandwidth are increased. As the track rate capability increases the track gate and the TAGC gate overtake the video return pulse and the proper amount of coincidence in the coincident gate circuit 19 and the coincident gate and peak sensing detector circuit 23 is again established. The proper amount of coincidence reduces the input signal to the double integrator 45 and these circuits are returned to normal.

In the event that the return time of the video pulse suddenly decreases the amount of coincidence between the track gate and the video pulse in the coincident gate circuit 19 increases and the amount of current flowing into the input 43 of the altitude rate integrator 44 is larger. Again assuming the change in return time is so sudden that the input to the integrator 44 is substantially a positive going step function, the integrated output at junction point 73 is a positive going sawtooth shaped signal. When the voltage across the resistor 84 and the diodes 79 and 80 becomes large enough diode 79 will break down and conduct current in the reverse direction. Thus, the rate of flow of input current into the altitude integrator 46 is abruptly increased at a predetermined point, which in turn increases the time constant of the integrator 46 and the track rate capability of the tracking loop for the length of time that the input signal causes the zener diode 79 to breakdown.

When the altitude of the radar changes, in either direction, for one reason or another, at a normal rate the track rate capability of the tracking loop allows the loop to track fast enough to maintain the proper amount of coincidence between the video pulse and the track gate and the TAGC gate. However, when the altitude changes abruptly the track rate capability of the tracking loop cannot change abruptly and coincidence between the video pulse and the track gate and the TAGC gate would be lost except that the present invention decreases the time constant of the altitude integrator abruptly upon the loss of coincidence between the video pulse and the track gate in the coincidence gate circuit 19, deviating, or changing, the time constant a predetermined amount from the normal value. Once the track rate capability and the acquisition bandwidth are increased the track gate quickly "recaptures" the video pulse and the normal amount of coincidence and track rate capability is reestablished. When the amount of coincidence returns back within the design limits, the zener diodes 79 and 80 are effectively no longer in the circuit and the entire tracking loop operates in a normal manner.

Because of this automatic and instantaneous increase in the track rate capability and the acquisition bandwidth of the tracking loop, coincidence between the video pulse and the track gate and the TAGC gate are not completely lost during sudden changes in the altitude and, consequently, the radar altimeter does not have to switch into the search mode of operation. Thus, the present invention gives the radar altimeter the advantage of a wide acquisition bandwidth for short periods when necessary and normal acquisition bandwidth under normal conditions.

While I have shown and described a specific embodiment of this invention the invention should not be limited to the particular form shown and I intend in the appended claims to cover all modifications which do not depart from the spirit and scope of this invention.

I claim as my invention:

1. A distance measuring device comprising:
   a track loop for tracking targets, said track loop having a relatively narrow acquisition bandwidth, and including a first and a second integrating means; and
   means connected to said second integrating means for decreasing the time constant thereof upon the application to said second integrating means of an input signal having at least a predetermined value, thereby broadening the acquisition bandwidth.

2. A distance measuring device comprising:
   a track loop for tracking targets, said track loop having a relatively narrow acquisition bandwidth, and including a first and a second integrating means, said second integrating means comprising
   (a) a high gain amplifier having an input and an output,
   (b) an output impedance connected to said input of said amplifier,
   (c) a feedback impedance connected from said output to said input of said amplifier, and
   (d) means connected to said input impedance for effectively reducing the value of said input impedance upon the application to said input of a signal having at least a predetermined value; and
   output means connected to said track loop.

3. A distance measuring device comprising:
   a track loop for tracking targets, said track loop having a relatively narrow acquisition bandwidth, and including a first and a second integrating means, said second integrating means comprising
   (a) a high gain amplifier having an input and an output,
   (b) an input impedance connected in series with said input of said amplifier,
   (c) a feedback impedance connected from said output to said input of said amplifier, and
   (d) zener diode means connected in parallel with said input impedance for maintaining the value of the voltage drop across said input impedance substantially constant upon the application to said input of a signal having at least a predetermined value; and
   output means connected to said track loop.

4. A distance measuring device comprising:
   a track loop having a narrow acquisition bandwidth and comprising, in combination
   (a) time modulator means responsive to a first signal and operable so as to produce a gate output a known time after the occurrence of said first signal,
   (b) coincident gate means connected so as to receive a second signal,
   (c) means connecting the gate output from said time modulator means to said coincident gate means whereby said coincident gate means produces an output signal,
   (d) first integrating means connected to receive the output signal from said coincident gate means and provide an output signal,
   (e) second integrating means connected to receive the output signal from said first integrating means and provide an output signal, and
   (f) means connecting said output signal from said second integrating means to said time modulator means to control the position of said gate whereby said gate is repositioned to follow any changes in the time between the occurrence of said first signal and said second signal; and
   means connected to said second integrating means for decreasing the time constant thereof, thereby broadening the acquisition bandwidth, upon the output signal of said first integrating means exceeding a predetermined value.

5. A distance measuring device comprising:
   a track loop having a narrow acquisition bandwidth and comprising, in combination
   (a) time modulator means responsive to a first signal and operable so as to produce a gate output a known time after the occurrence of said first signal,
   (b) coincident gate means connected so as to receive a second signal,
   (c) means connecting the gate output from said time modulator means to said coincident gate means whereby said coincident gate means produces an output signal,
   (d) first integrating means connected to receive the output signal from said coincident gate means and provide an output signal,
   (e) second integrating means connected to receive the output signal from said first integrating means and provide an output signal, and
   (f) means connecting said output signal from said second integrating means to said time modulator means to control the position of said gate whereby said gate is repositioned to follow any changes in the time between the occurrence of said first signal and said second signal; and
   zener diode means connected to said second integrating means for decreasing the time constant thereof, thereby broadening the acquisition bandwidth, upon the output signal of said first integrating means exceeding a predetermined value.

6. A distance measuring device comprising:
a track loop having a relatively narrow acquisition bandwidth and comprising in combination
   (a) time modulator means responsive to a first signal and operable so as to produce a gate output a known time after the occurrence of said first signal,
   (b) coincident gate means connected so as to receive a second signal,
   (c) means connecting the gate output from said time modulator means to said coincident gate means whereby said coincident gate means produces an output signal,
   (d) first integrating means connected to receive the output signal from said coincident gate means,
   (e) second integrating means connected to said first integrating means comprising a high gain amplifier having an input and an output, a series impedance connected to said input and a feedback impedance connected from said output to said input, said series impedance and said feedback impedance determining the time constant of said second integrating means, and
   (f) means connecting said second integrating means to said time modulator means to control the position of said gate whereby said gate is repositioned to follow any changes in the time between the occurrence of said first signal and said second signal; and
zener diode means connected in parallel with said series impedance for decreasing the time constant of said second integrating means, thereby broadening the acquisition bandwidth, upon the application to the second integrating means of an input signal having at least a predetermined value.

References Cited by the Examiner
UNITED STATES PATENTS
2,939,083    5/1960    Hague et al.

CHESTER L. JUSTUS, Primary Examiner.

MAYNARD R. WILBUR, Examiner.

THEODORE H. TUBBESING, Assistant Examiner.